United States Patent [19]

Stanford et al.

[11] Patent Number: 5,456,830
[45] Date of Patent: Oct. 10, 1995

[54] REPLACEABLE FILTER CARTRIDGE FOR ACTUATING SAFETY SHUT-OFF VALVE IN MOUNTING HEAD

[75] Inventors: Ralph F. Stanford, Clinton, Iowa; Stephen E. Gatz, Galt, Ill.

[73] Assignee: Elkay Manufacturing Company, Oak Brook, Ill.

[21] Appl. No.: 226,498

[22] Filed: Apr. 12, 1994

Related U.S. Application Data

[62] Division of Ser. No. 9,566, Jan. 26, 1993, Pat. No. 5,336,406.

[51] Int. Cl.⁶ ............................ B01D 27/08; B01D 27/10
[52] U.S. Cl. .................................. 210/235; 210/440; 210/443
[58] Field of Search ........................... 210/232, 235, 210/288, 443, 423, 438, 440, 450, 456, 500.21

[56] References Cited

U.S. PATENT DOCUMENTS

| | | | |
|---|---|---|---|
| 3,746,171 | 7/1973 | Thomsen | 210/234 |
| 4,052,307 | 10/1977 | Humbert et al. | 210/235 |
| 4,077,876 | 3/1978 | Southall | 210/235 |
| 4,735,716 | 4/1988 | Petrucci et al. | 210/232 |
| 4,915,831 | 4/1990 | Taylor | 210/232 |

*Primary Examiner*—Robert A. Dawson
*Assistant Examiner*—W. L. Walker
*Attorney, Agent, or Firm*—Leydig, Voit & Mayer, Ltd.

[57] ABSTRACT

A filter assembly adapted for connection between fluid supply and delivery lines to filter fluid flowing therethrough includes a replaceable filter cartridge having at one end concentric entrance and exit passages confined within an axially outwardly projecting annular wall and a mounting head having inlet and outlet ports adapted for substantially fixed connection to the supply and delivery lines, respectively. The mounting head has a cylindrical recess for sealingly receiving the annular wall of the filter cartridge therein, and the filter cartridge and the mounting head each have complementary interfitting ears and lugs thereon for permitting quick locked connection and unlocked disconnection of the filter cartridge to and from the mounting head incident to axial rotation of the filter cartridge in opposite directions, respectively, relative to the mounting head. A normally closed safety shut-off valve is disposed in the inlet passage of the mounting head and a valve operating cam on one end of the filter cartridge is provided for opening the valve incident to axial rotation of the filter cartridge into fully locked connection with the mounting head.

14 Claims, 5 Drawing Sheets

REPLACEABLE FILTER CARTRIDGE FOR ACTUATING SAFETY SHUT-OFF VALVE IN MOUNTING HEAD

This is a divisional of application(s) Ser. No. 08/009,566, filed on Jan. 26, 1993, now U.S. Pat. No. 5,336,406.

FIELD OF THE INVENTION

The present invention relates generally to replaceable filter cartridge and head assemblies and more particularly concerns an assembly of this type having a safety shut-off valve that is automatically opened and closed while the cartridge is sealingly engaged with the head as the cartridge is being installed or removed.

BACKGROUND OF THE INVENTION

It is generally known in the filtration art to equip a fluid supply line with a filter unit to remove impurities from the fluid flowing therethrough. It is also known in the art to utilize a fixed filter mounting head in the supply line and employ a replaceable filter cartridge which may be easily connected to and disconnected from the fixed mounting head.

Examples of such replaceable filter cartridge and head assemblies may be found in U.S. Pat. Nos. 3,746,171, 4,735,716 and 4,915,831. The filter assembly shown in U.S. Pat. No. 3,746,171 employs an external locking collar to secure the filter cartridge to the mounting head and provides a manually operated shut-off valve to block the flow of fluid through the head when the filter cartridge is being replaced. The filter assemblies disclosed in the U.S. Pat. No. 4,735,716 and U.S. Pat. No. 4,915,831 patents employ filter cartridges having a bayonet type connection to the mounting head but utilize one axial and one radial flow passage into the cartridge. The latter patent also includes a manually movable detent to prevent removing the filter cartridge from the mounting head until the fluid flow is turned off.

OBJECTS AND SUMMARY OF THE INVENTION

The primary aim of the present invention is to provide a replaceable filter cartridge and mounting head assembly with a safety shut-off valve that is automatically closed if a filter cartridge is not sealingly engaged with the mounting head.

A further object of the invention is to provide such an assembly wherein the shut-off valve is automatically opened only after the filter cartridge is sealed and secured to the mounting head as a new cartridge is installed and is closed before the cartridge is unsealed and released from the mounting head as a used cartridge is being removed.

It is also a more detailed and specific object to provide a filter assembly of the above type wherein the entrance and exit flow passages in the filter cartridge are disposed in annular coaxial relationship to one another and mate with corresponding coaxial flow inlet and outlet passages in the mounting head.

These and other features and advantages of the invention will be more readily apparent upon reading the following description of a preferred exemplified embodiment of the invention and upon reference to the accompanying drawings wherein:

BRIEF DESCRIPTION OF THE DRAWING

FIGS. 7a, 7b and 7c are horizontal cross-sections of the top of the replaceable filter cartridge and the mounting head substantially as seen along line 7—7 in FIG. 1, wherein FIG. 7a shows the cartridge unlocked from the mounting head as the cartridge is being installed or removed; FIG. 7b shows the filter cartridge rotated into an intermediate secured position sealed within the mounting head; and FIG. 7c shows the filter cartridge rotated to its fully locked position, respective.

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENT

Figure 1:
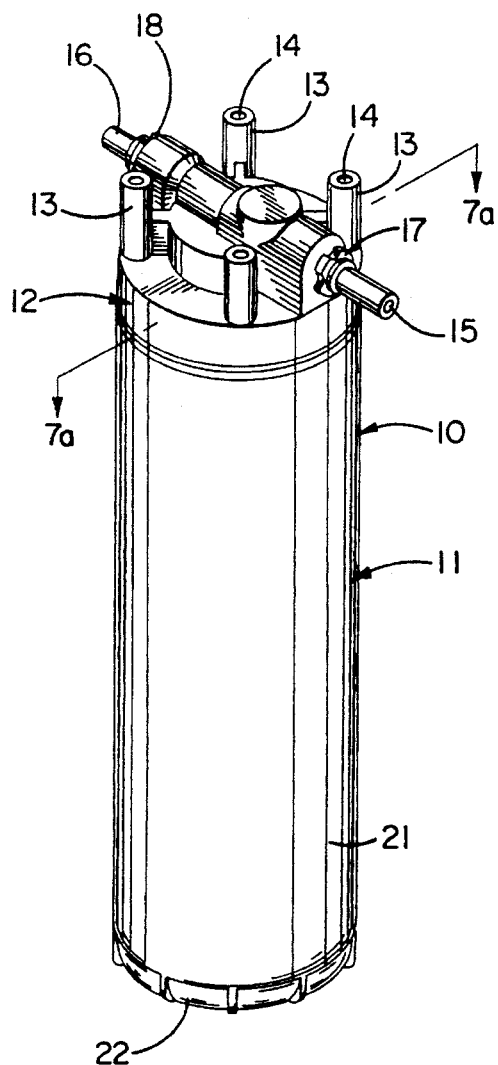
FIG. 1 is a perspective view of a filter cartridge and mounting head assembly including the automatic safety shut-off valve of the present invention.
Figure 2:
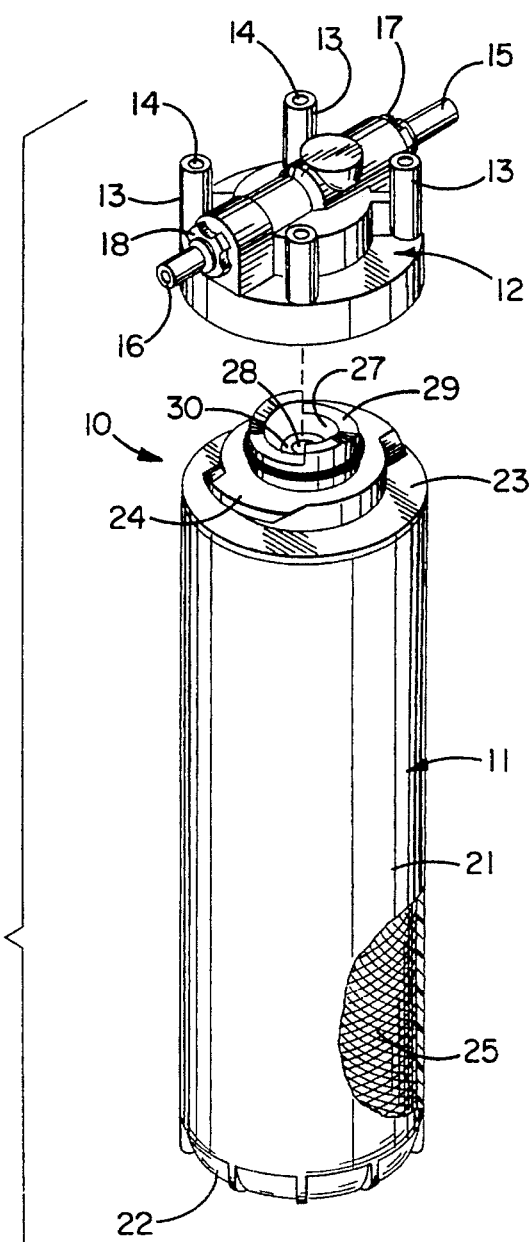
FIG. 2 is an exploded perspective view, similar to FIG. 1 showing the filter cartridge separated from the mounting head and with a portion of the cartridge casing broken out to show the filter element.

Turning now to the drawings, FIGS. 1 and 2 show a fluid filter assembly 10 including a replaceable filter cartridge 11 and a mounting head 12 enclosing the automatic safety shut-off valve of the present invention, which will be described in detail hereinafter. In FIG. 1, the assembly 10 is shown with the cartridge 11 secured to the mounting head 12 in its operative position. In FIG. 2, the replaceable filter cartridge 11 is shown separated from the mounting head 12, as the cartridge might appear when it is being installed in or removed from the mounting head.

As shown in FIGS. 1 and 2, the mounting head 12 is preferably formed with a plurality of mounting bosses or the like 13 which may be utilized to securely mount the head 12 on a suitable fixture or mounting plate, not shown. Preferably, each of the mounting bosses 13 is provided with a bore 14 for receiving a suitable fastening device such as a self-tapping screw or the like, not shown. Alternatively, the bores 14 may be internally threaded, if desired, for receiving mounting bolts or cap screws, or the bosses 13 could be externally threaded to receive nuts or other fasteners.

The filter assembly 10 of the present invention has particular utility for filtering fluids in an in-line delivery system, such as a drinking water dispenser or the like. For this purpose, it will be understood that the mounting head 12 is connected to a supply line 15 and a delivery line 16 with suitable inlet and outlet fittings or connectors 17 and 18, respectively, which may be of the type used for conventional plumbing installations. Thus, fluid flows from the supply line 15 into the mounting head 12, where it is directed through the replaceable filter cartridge 11 and then back through the head 12 and out the delivery line 16.

Figure 4:
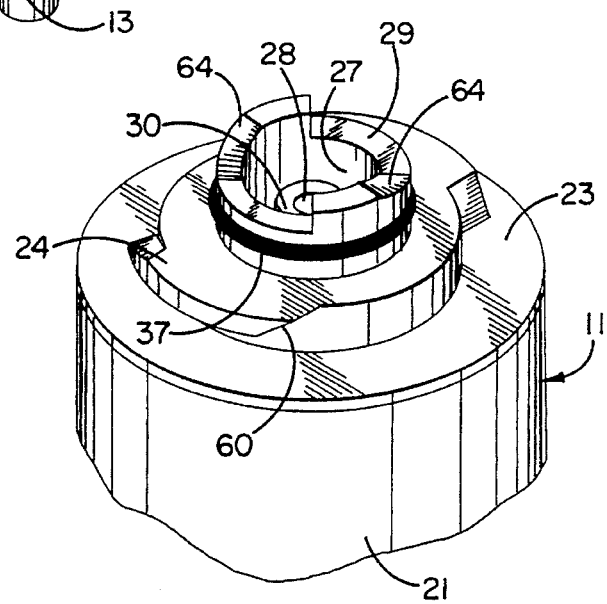
FIG. 4 is an enlarged, fragmentary perspective view of the upper portion of the replaceable filter cartridge shown in FIGS. 1 and 2.

Referring to FIGS. 2 and 4, the illustrative filter cartridge 11 preferably includes a cylindrical shell or housing 21 closed at its bottom by a base 22 and fitted at its top with a mounting cap 23 formed with locking means 24 for securing the filter cartridge 11 to the mounting head 12 in sealed relationship, as will be described below. Within the housing 21, the cartridge 11 includes a filter element 25 which may be formed of suitable filter medium such as pleated filter paper, activated carbon, other granular material, or the like, the details of which are not essential to the present invention.

In accordance with one aspect of the invention, the filter cartridge 11 is provided with concentric annular entrance and exit passages 27 and 28, respectively, for directing the flow of fluid from the mounting head 12 through the filter element .25 within the cartridge housing 21 and back into the mounting head. As shown in FIGS. 2 and 4, and in more detail in FIGS. 7a–c and 8a–c, the entrance and exit passages 27 and 28 are preferably coaxially disposed at the top end of the cartridge 11. To this end, the mounting cap 23 is formed with an axially extending annular collar 29, the inner surface of which defines the entrance passage 27, and the filter element 25 is provided with a hollow axially extending stem 30, the bore of which defines the exit passage 28.

Figure 3:
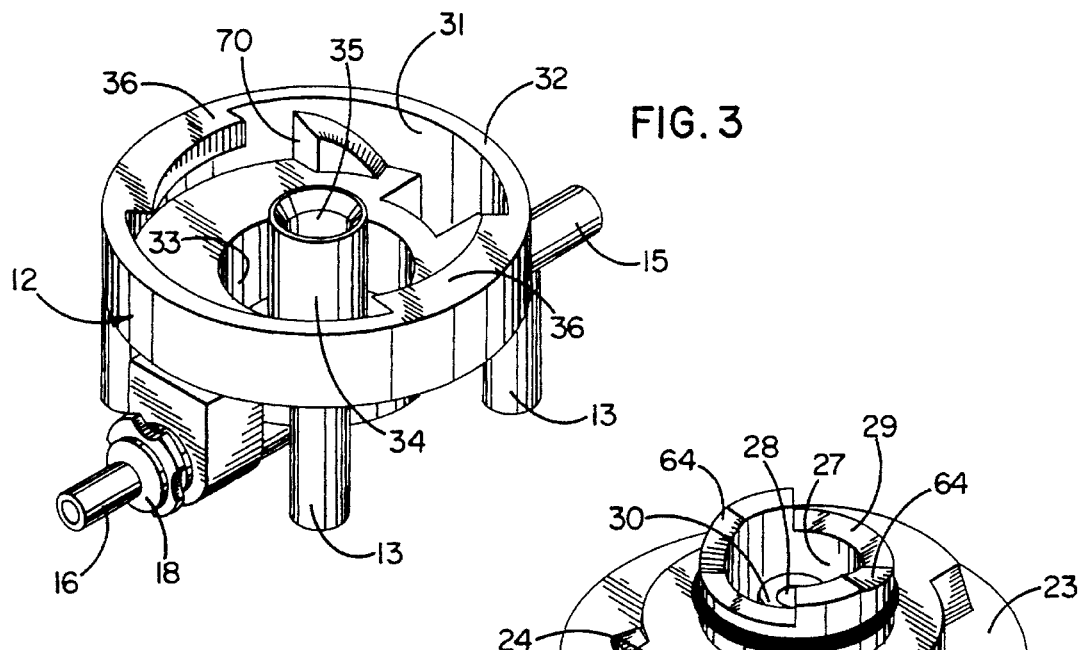
FIG. 3 is an enlarged perspective view of the underside of the mounting head shown in FIGS. 1 and 2.

Referring now to FIG. 3, the mounting head 12 is shown here in an inverted or upside-down position. In the preferred embodiment, the underside of the mounting head 12 is formed with a generally cylindrical outer cavity 31 defined by an outer depending wall or skirt 32, an intermediate cylindrical recess 33 and a hollow inner sleeve 34 having a central bore 35. The outer cavity 31, the intermediate recess 33 and the central bore 35 are coaxially disposed with respect to one another. Pursuant to the invention, the underside of the mounting head 12 is also formed with locking means preferably in the form of at least a pair of circumferentially disposed opposed lugs 36 which project radially inwardly from the depending outer wall 32 and cooperate with the mounting means 24 on the cartridge end cap 23 to secure the filter cartridge 11 and mounting head 12 together.

Figure 8A:
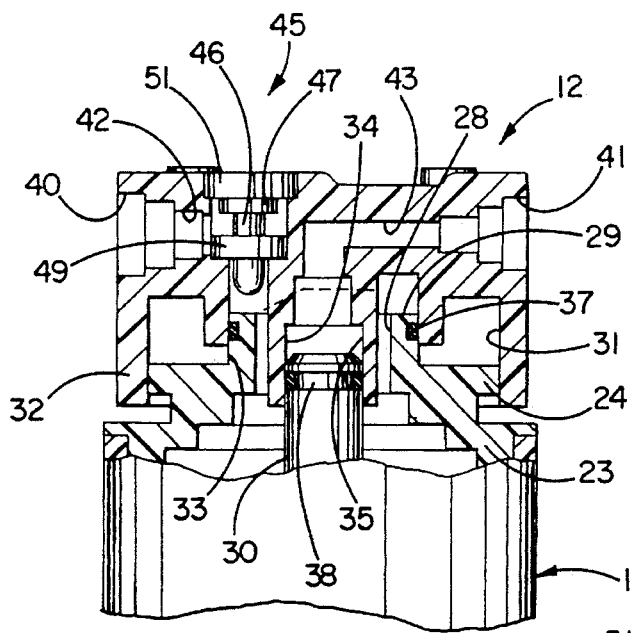
FIGS. 8a, 8b and 8c are fragmentary vertical cross-sections of the top of the replaceable filter cartridge and the mounting head substantially as seen along lines 8a—8a, 8b—8b and 8c—8c in FIGS. 7a, 7b and 7c, respectively, showing the relationship of the filter cartridge and mounting head locking lugs and the operation of the automatic safety valve from the closed position in FIGS. 8a and 8b to the open position in FIG. 8c as the cartridge is inserted, secured in its intermediate sealed position and locked in its final position within the mounting head.
Figure 8B:
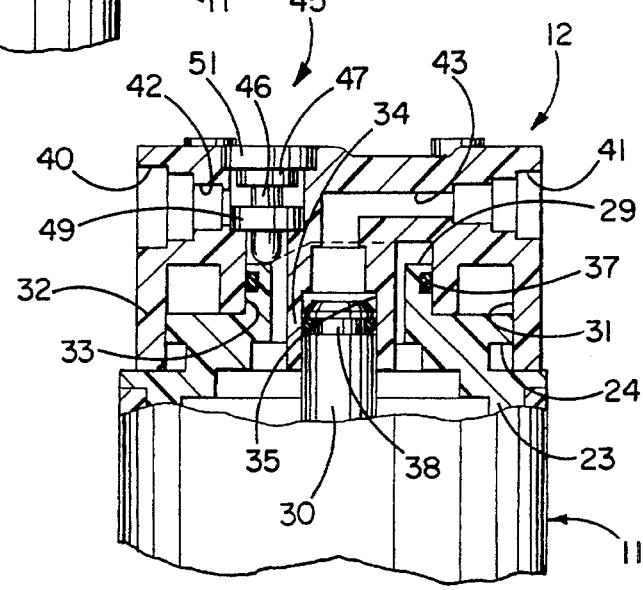
Figure 8C:
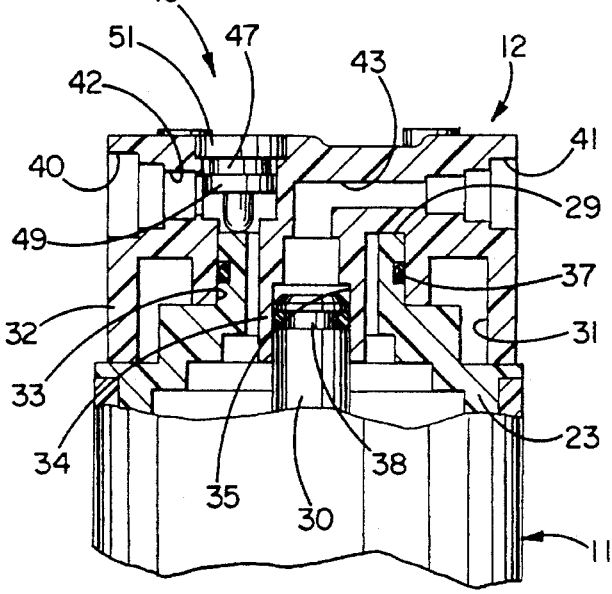

In order to seal the filter cartridge 11 to the mounting head 12 so as to prevent fluid leakage, the annular collar 29 on the filter cartridge end cap 23 and the coaxial stem 30 of the filter element 25 are preferably fitted with seal elements, such as O-rings 37 and 38, respectively. As shown in FIGS. 8a–c, the O-ring seal 37 on the collar 29 is dimensioned for fluid-tight sealing engagement with the annular wall which defines the intermediate recess 33 of the mounting head 12. Similarly, the O-ring seal 38 on the filter element stem 30 is dimensioned for fluid-tight sealing engagement with the central bore 35 of the coaxial sleeve 34 of the mounting head 12.

For the sake of clarity and to simplify the illustrations, the supply and delivery lines 15 and 16 and their respective fittings 17 and 18, which are shown in FIGS. 1–3 and 6, have been omitted from FIGS. 8a–c. Rather, as shown in FIGS. 8a–c, the mounting head 12 is formed with an inlet port 40 which is adapted to receive the supply line 15 and its fitting 17 and an outlet port 41 which is adapted to receive the delivery line 16 and its fittings 18. A generally L-shaped inlet passage 42 in the mounting head 12 extends radially inwardly from the inlet port 40 and then downwardly in a generally axial direction so as to open into the intermediate cylindrical recess 33. Somewhat similarly, a generally L-shaped outlet passage 43 in the mounting head 12 extends radially inwardly from the outlet port 41 and then axially downwardly so as to open into the bore 35 of the inner sleeve 34 which receives the hollow stem 38 of the filter element 25.

In accordance with the present invention, an automatic safety shut-off valve assembly 45 is provided in the inlet passage 42 of the mounting head 12 to prevent the flow of fluid therethrough unless a filter cartridge 11 is inserted and sealed to the head. This insures that incoming fluid is not discharged from the mounting head 12 when a filter cartridge 11 is not in place or when a used cartridge is being removed or a new replacement filter cartridge is being installed.

Figure 5:
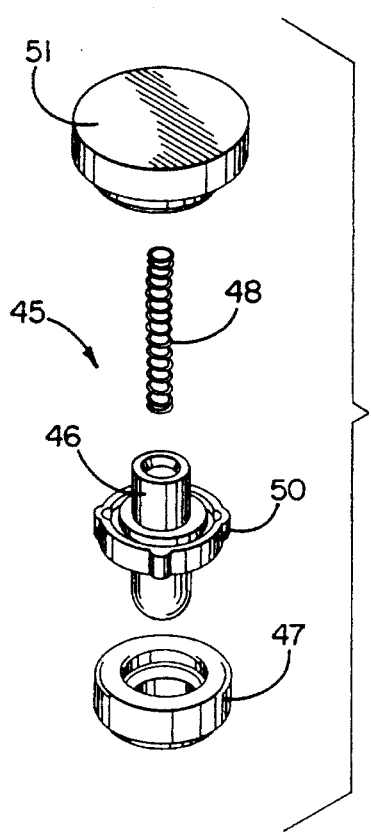
FIG. 5 is an enlarged, exploded perspective view of a preferred embodiment of the safety shut-off valve of the present invention.
Figure 6:
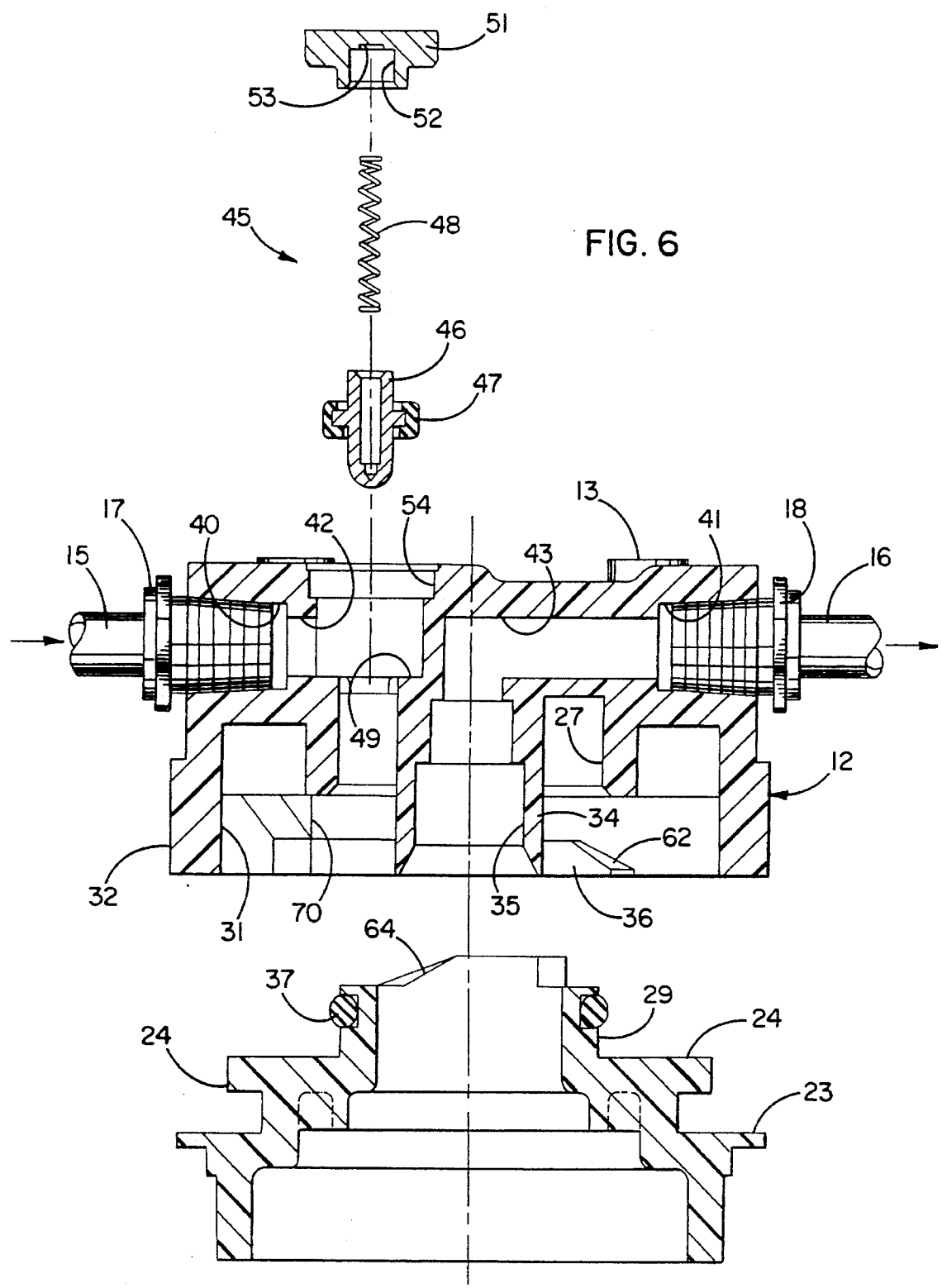
FIG. 6 is a further enlarged, exploded, vertical cross-sectional view of the filter cartridge top, the mounting head and the safety shut-off valve of the present invention.
Figure 7A:
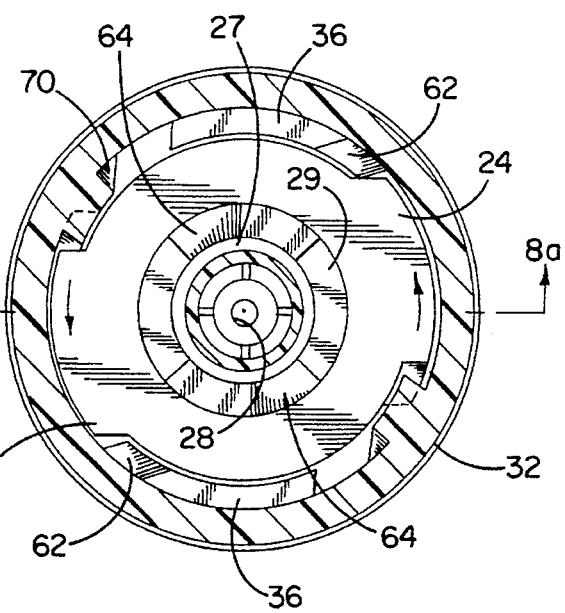

Referring to FIGS. 5, 6 and 7a, the safety valve assembly 45 is preferably of the spring biased poppet type and includes a valve stem 46 surrounded by an enlarged, generally annular valve head 47. In the preferred embodiment and as illustrated in FIG. 5 and 6, the valve stem 46 is hollow and receives a small compression spring 48 which biases the valve assembly 45 to its normally closed position with the valve head 47 seated on an annular shoulder 49 formed in the inlet passage 42 of the mounting head 12 (See FIGS. 8a and 8b). Also in the preferred embodiment the valve stem is initially molded of relatively rigid plastic material with an annular disc-shaped enlargement 50 intermediate its ends and the valve head 47, which is formed of a more resilient elastomeric material, is co-molded directly on the enlarged disc 50. The valve assembly is held in place in the inlet passage 42 by a plug or cap 51 which is preferably formed with a center recess 52 dimensioned to slidably receive the upper end of the valve stem 46 and a center depression 53 dimensioned to receive and stabilize the upper end of the spring 48. The plug 51 may be threaded, press-fit or bonded in an aperture 54 in the mounting head 12 located coaxially with respect to the valve seat 49.

To secure the filter cartridge 11 to the mounting head 12 and lock the cartridge in place, the cartridge is first slid axially into the outer cavity 31 formed in the underside of the head 12. As shown in FIG. 7a the locking means 24, which are preferably in the form of at least a pair of circumferentially opposed ears projecting radially outwardly on the cartridge cap 23, are dimensioned to fit in the spaces between the ends of the circumferentially disposed, radially inwardly projecting lugs 36 on the skirt 32 of the head 12. At the same time, the O-ring seal 37 on the cap collar 29 is slid upwardly in sealing engagement with the annular wall of the intermediate cylindrical recess 33 in the head 12 and the O-ring seal 38 on the coaxial stem 30 of the filter element 25 is slid upwardly in sealing engagement with the central bore 35 of the inner sleeve 34 of the mounting head. The cap end 23 of the cartridge 11 is then disposed in the mounting head 12 substantially as shown in FIGS. 7a and 8a.

It will also be seen in FIG. 8a that although the O-rings 37 and 38 are already sealed against their cooperating walls in the filter head recess 33 and central bore 35, the safety shut-off valve 45 remains biased closed by the spring 48 with the valve head 47 firmly seated on the valve seat 49 in the inlet passage 42. Thus, the filter cartridge 11 is sealed to the mounting head 12 before the shut-off valve 45 is opened.

Pursuant to the invention, the safety shut-off valve 45 is automatically opened and closed by axial rotation of the filter cartridge 11 in opposite directions, respectively, relative to the mounting head 12. To this end, valve operating means are provided on the upper end of the filter cartridge for urging the valve stem 46 upwardly against the bias of the spring 48. This lifts the valve head 47 off the seat 49 and allows fluid to flow from the inlet port 40 through the inlet passage 42 in the mounting head 12 and into the entrance passage 27 of the filter cartridge 11. The fluid flows down into the cartridge housing 21 and passes radially through the filter medium in the filter element 25 to the center thereof and then up and out from the exit passage 28 in the hollow stem 30 of the filter element. Because the stem 30 of the filter element 25 is sealed by the O-ring 38 against the inner wall 35 of the sleeve 34 in the mounting head 12, the fluid flows from the filter cartridge 11 out through the outlet passage 43 and the outlet port 41 of the mounting head.

To lock the filter cartridge 11 to and unlock it from the mounting head 12, the respective connecting means 24 on the cartridge and 36 on the head are preferably formed as cooperating bayonet-type fittings. Moreover, these fittings are provided with mating cam surfaces on their respective leading ends which act to draw the filter cartridge 11 firmly into engagement with the mounting head 12. Referring first to FIG. 4, it will be seen that the radially projecting mounting ears 24 on the cartridge are each provided with an inclined camming surface 60. Also, as shown in FIG. 7a, the opposed mounting lugs 36 on the skirt 32 of the mounting head 12 are each formed with inclined camming ramps 62.

In FIG. 7a the mounting ears 24 of the cartridge 11 are shown as being disposed in the circumferential open spaces between the ends of the opposed mounting lugs 36 on the head 12. Thus, the cartridge 11 may be slid axially into or out of the outer cavity 31 and intermediate recess 33 of the mounting head 12. At the same time the stem 30 of the filter element 25 is slid axially into and out of the central bore 35 of the coaxial sleeve 34 of the head. This insures that the O-ring seal 37 on the annular collar 29 and the O-ring seal 38 on the stem 30 are sealingly engaged with the annular walls which respectively define the intermediate recess 33 and the central bore of the sleeve 34.

Figure 7B:
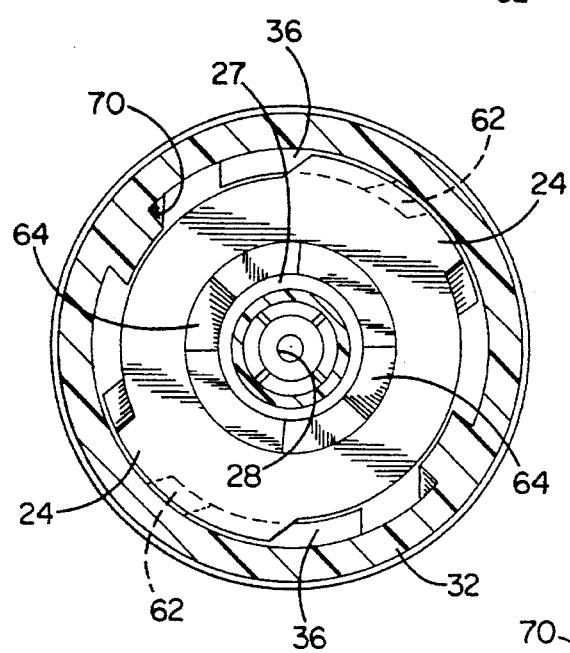

As the filter cartridge 11 is axially rotated in a counter-clockwise direction from the position shown in FIG. 7a to the position shown in FIG. 7b, the mating cams 60 and 62 on the cartridge ears 24 and mounting head lugs 36 engage and ride over one another to draw the cartridge upwardly into the head cavity 31. This upwardly moved position is shown in FIG. 8b. It will also be seen in FIG. 8b that the safety shut-off valve 45 is still closed. Thus, it will be appreciated that the filter cartridge 11 is both sealed and firmly secured in the mounting head 12 before the safety shut-off valve is opened. This prevents the flow of fluid, which may be under pressure, through the inlet passage 42 before the cartridge is sealed and held in place in the mounting head.

Figure 7C:
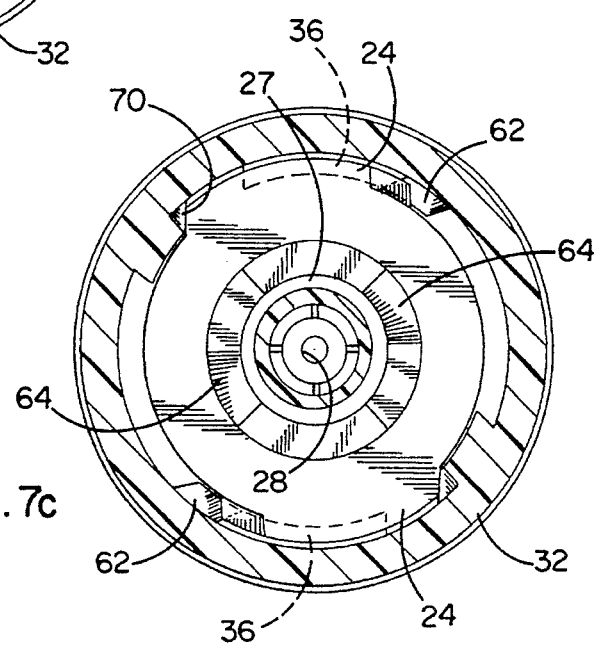

To open the safety shut-off valve 45, the cartridge is axially rotated from the position shown in FIGS. 7b and 8b to the position shown in FIGS. 7c and 8c. In the preferred embodiment, and as shown in FIG. 4, the valve operating means on the filter cartridge 11 is in the form of a pair of inclined cams 64 on the outer end of the upwardly projecting annular collar 29. It will be noted that the valve operating cams 64 are symmetrically disposed with respect to one another and are circumferentially displaced from the cams 60 on the leading ends of the mounting ears 24 of the cartridge. The symmetrical disposition of the mounting ears 24 and valve operating cams 64, of course, permits the filter cartridge 11 to be inserted into the mounting head 12 in either of two orientations 180° apart.

As the filter cartridge is rotated from the FIG. 7b, 8b position to the FIG. 7c, 8c position, one of the valve operating cams 64 engages and lifts the stem 46 of the shut-off valve 45. Preferably the lower end of the valve stem 46 is rounded so that it rides easily on the operating cam 64. In FIG. 8c the safety shut-off valve 45 is shown in its fully open position and fluid is now free to flow in through the inlet port 40 of the head, through the inlet passage 42 and into and through the filter cartridge 11. Because the fluid is under pressure it passes through the filter medium of the filter element 25, then up through the exit passage 28 in the stem of the element 25 and out through the bore 35 of the inner sleeve 34 in the head 12. The fluid then flows out through the outlet passage 43 and the outlet port 41 of the head.

In order to prevent over-rotating the filter cartridge 11 with respect to the mounting head 12 when a replacement cartridge is being installed, the head is provided with a pair of symmetrical stops 70 in the cavity 31. As shown in FIG. 7c, the stops 70 are disposed to engage the leading ends of the cartridge mounting ears 24 as the cartridge is rotated in a counter-clockwise direction. It will also be seen in FIG. 7c that the arcuate length of the cartridge ears 24 and mounting head lugs 36 is such that they are still in substantial engagement with one another when the leading edge of the ears 24 abuts the stops 70. This insures that the filter cartridge 11 is held firmly and securely in the mounting head 12 in its locked position even if the fluid flowing through the head and cartridge is under substantial pressure.

We claim as our invention:

1. A replaceable fluid filter cartridge for use with a mounting head having inlet and outlet ports adapted for connection to fluid supply and delivery lines, respectively, said mounting head having an outer cavity, an axially disposed cylindrical recess, normally closed valve means including a valve head and a projecting valve stem interposed between said inlet port and said cylindrical recess, an inner concentric sleeve having a central bore communicating with said outlet port, and cartridge connecting means circumferentially disposed in said outer cavity for securing and locking said filter cartridge to said mounting head, said filter cartridge comprising, in combination, a generally cylindrical housing enclosing a filter medium and having at one end concentric entrance and exit passages confined within an axial outwardly projecting annular wall adapted for sealing connection within said cylindrical recess of said mounting head, complementary connecting means projecting radially outwardly from said annular wall for engaging and disengaging said cartridge connecting means on said mounting head incident to axial rotation of said filter cartridge in opposite directions, respectively, relative to said mounting head, and valve operating means including an inclined cam on said outwardly projecting annular wall on said one end of said filter cartridge for engaging said valve stem and opening said valve means incident to axial rotation of said cartridge into sealing engagement with said mounting head.

2. A filter cartridge as defined in claim 1 wherein said complementary connecting means on said filter cartridge are dimensioned and disposed for securely engaging said cartridge connecting means on said mounting head incident to axial rotation of said filter cartridge relative to said mounting head prior to said valve operating means on said filter cartridge opening said valve means on said mounting head.

3. A filter cartridge as defined in claim 2 wherein said cartridge connecting means on said mounting head includes at least a pair of circumferentially disposed lugs in said mounting head outer cavity and said complementary connecting means on said filter cartridge includes a corresponding number of radially outwardly projecting ears on said annular wall of said filter cartridge.

4. A filter cartridge as defined in claim 3 wherein said radially projecting ears and said circumferentially disposed lugs are formed with inclined mating cam surfaces on their respective leading edges so as to draw said annular wall of said filter cartridge securely into said cylindrical recess of said mounting head.

5. A filter cartridge as defined in claim 4 including an outwardly projecting hollow cartridge stem disposed concentrically within said annular wall and said mounting head includes an inner sleeve having a central bore for sealingly receiving said hollow cartridge stem therein.

6. A filter cartridge as defined in claim 5 including first sealing means disposed on said annular wall of said filter cartridge for sealing engagement with said cylindrical recess in said mounting head and second sealing means disposed on said hollow cartridge stem for sealing engagement with said central bore of said mounting head inner sleeve.

7. A filter cartridge as defined in claim 2 including an outwardly projecting hollow cartridge stem disposed concentrically within said annular wall and said mounting head includes an inner sleeve having a central bore for sealingly receiving said hollow cartridge stem therein.

8. A filter cartridge as defined in claim 7 including first sealing means disposed on said annular wall of said filter cartridge for sealing engagement with said cylindrical recess in said mounting head and second sealing means disposed on said hollow cartridge stem for sealing engagement with said central bore of said mounting head inner sleeve.

9. A filter cartridge as defined in claim 1 wherein said cartridge connecting means on said mounting head includes at least a pair of circumferentially disposed lugs in said mounting head outer cavity and said complementary connecting means on said filter cartridge includes a corresponding number of radially outwardly projecting ears on said annular wall of said filter cartridge.

10. A filter cartridge as defined in claim 9 wherein said radially projecting ears and said circumferentially disposed lugs are formed with inclined mating cam surfaces on their respective leading edges so as to draw said annular wall of said filter cartridge securely into said cylindrical recess of said mounting head.

11. A filter cartridge as defined in claim 1 including an outwardly projecting hollow cartridge stem disposed concentrically within said annular wall and said mounting head includes an inner sleeve having a central bore for sealingly receiving said hollow cartridge stem therein.

12. A filter cartridge as defined in claim 11 including first sealing means disposed on said annular wall of said filter cartridge for sealing engagement with said cylindrical recess in said mounting head and second sealing means disposed on said hollow cartridge stem for sealing engagement with said central bore of said mounting head inner sleeve.

13. A filter cartridge as defined in claim 1 wherein said mounting head includes an inner sleeve having a central bore for communicating with said exit passage of said filter cartridge and including means for sealing said filter cartridge and mounting head adjacent said entrance and exit passages of said filter cartridge and said respective cylindrical recess and central bore of said mounting head.

14. A filter cartridge as defined in claim 13 wherein said sealing means are disposed on said filter cartridge for sealing engagement with said cylindrical recess and said central bore upon axial insertion of said filter cartridge into said mounting head prior to axial rotation of said filter cartridge into locked connection with said mounting head.

* * * * *